(12) United States Patent
Matsumoto et al.

(10) Patent No.: US 10,628,642 B2
(45) Date of Patent: Apr. 21, 2020

(54) WIRELESS COMMUNICATOR-INDICATOR

(71) Applicant: SHARP KABUSHIKI KAISHA, Sakai (JP)

(72) Inventors: Takehide Matsumoto, Sakai (JP); Ryohei Takata, Sakai (JP); Kenta Fujimoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 64 days.

(21) Appl. No.: 16/111,843

(22) Filed: Aug. 24, 2018

(65) Prior Publication Data

US 2019/0065796 A1    Feb. 28, 2019

(30) Foreign Application Priority Data

Aug. 28, 2017   (JP) ................... 2017-163417

(51) Int. Cl.
| | |
|---|---|
| G06K 7/10 | (2006.01) |
| G06K 19/07 | (2006.01) |
| H04B 5/00 | (2006.01) |
| H04W 4/80 | (2018.01) |
| G06Q 10/00 | (2012.01) |
| H04W 4/00 | (2018.01) |

(52) U.S. Cl.
CPC ..... *G06K 7/10366* (2013.01); *G06K 19/0701* (2013.01); *G06K 19/0723* (2013.01); *G06Q 10/00* (2013.01); *H04B 5/0056* (2013.01); *H04W 4/00* (2013.01); *H04W 4/80* (2018.02)

(58) Field of Classification Search
CPC ........... G06K 7/10366; G06K 19/0701; G06K 19/0723
USPC ...................................... 235/492, 451
See application file for complete search history.

(56) References Cited

U.S. PATENT DOCUMENTS

| | | | | |
|---|---|---|---|---|
| 5,875,434 A | * | 2/1999 | Matsuoka | B65G 1/1376 235/385 |
| 6,108,367 A | * | 8/2000 | Herman | G06K 7/0008 375/133 |

(Continued)

FOREIGN PATENT DOCUMENTS

| | | | |
|---|---|---|---|
| CN | 104933381 A | * | 9/2015 |
| JP | 2005-132580 A | | 5/2005 |

*Primary Examiner* — Paultep Savusdiphol
(74) *Attorney, Agent, or Firm* — ScienBiziP, P.C.

(57) ABSTRACT

A wireless communicator-indicator for communicating with a management apparatus that manages progress in a picking operation includes: an indication unit that provides an indication for mating an operator recognize a position of a picking target item; a first wireless communication circuit that receives indication instruction information transmitted from the management apparatus by a radio wave, and records or outputs electronic information reflecting the indication instruction information with energy of the received radio wave; an operation accepting unit that accepts an operation relating to picking operation completion; a power supply circuit; a second wireless communication circuit that transmits picking operation completion information with power of the power supply circuit; and a controller that controls the indication unit to provide an indication on the basis of the electronic information, and controls the second wireless communication circuit to transmit the picking operation completion information on the basis of the accepted operation.

9 Claims, 11 Drawing Sheets

(56) References Cited

U.S. PATENT DOCUMENTS

| | | | | |
|---|---|---|---|---|
| 9,451,674 B1* | 9/2016 | Kong | ............... | H05B 47/155 |
| 2005/0205670 A1* | 9/2005 | Natori | ............... | G06Q 20/203 |
| | | | | 235/383 |
| 2006/0206235 A1* | 9/2006 | Shakes | ............... | G06Q 10/08 |
| | | | | 700/216 |
| 2018/0365631 A1* | 12/2018 | Moulin | ............... | G06Q 10/087 |

* cited by examiner

WIRELESS COMMUNICATOR-INDICATOR

BACKGROUND

1. Field

The present disclosure relates to a wireless communicator-indicator and relates more specifically to a wireless communicator-indicator for a picking system used to provide an indication for indicating a picking target item to an operator on the basis of a notification from a management apparatus.

2. Description of the Related Art

A picking system is available in which a rack is partitioned into a large number of sections, different types of items are stored in the respective sections, and a management computer gives an operator an instruction indicating an item to be picked. Specifically, a picking system using radio frequency identifier (RFID) tags is available (see, for example, Japanese Unexamined Patent Application Publication No. 2005-132580, hereinafter referred to as PTL 1).

For a picking system that is flexibly adaptable to a modification of, for example, a production line, PTL 1 proposes a cordless rack configuration that is implemented by providing a radio frequency tag (also called an integrated-circuit (IC) tag or an RFID tag) and a display unit driven by a battery (button battery) in each section of the rack.

In PTL 1, an operator wears an antenna unit of a section information reader that is a portable IC, tag reader on, for example, their wrist. When picking a picking target item from a section indicated by the display unit, the operator performs an operation of bringing the section information reader (more specifically, the antenna unit thereof) close to the radio frequency tag of the section. By performing this operation, identification information stored in the radio frequency tag is read by the section information reader. The section information reader transmits the read identification information to a picking management unit, which is a management computer.

In the configuration according to PTL 1, picking instruction information that is wirelessly transmitted from the picking management unit is received by the display unit of each section driven by the battery. The picking instruction information includes identification information of the section in which the picking target item is stored. The display unit of the instruction target section turns on an indicator thereof in accordance with the identification information to inform the operator that the section is a picking target section.

When the operator performs the operation of bringing the section information reader close as described above upon picking the item, the section information reader carried by the operator reads identification information of the radio frequency tag and wirelessly transmits the identification information the picking management unit.

The picking management unit compares the received identification information with the identification information included in the picking instruction information. If the pieces of identification information match, the picking management unit transmits to the display unit an instruction for turning off the indicator. If the pieces of identification information do not match, the picking management unit transmits to the display unit an instruction for alarm display to inform the operator of picking from a wrong section.

With the configuration according to PTL 1, a wireless rack is implemented, although the operator needs to carry the section information reader. From the viewpoints of safety and easy operations, it is desirable to provide a picking system in which the operator need not carry a predetermined device.

Further, in the configuration according to PTL 1, the display unit includes the battery, and the power of the battery is used to perform all processes including receiving picking instruction information from the picking management unit, comparing with identification information, indicating by the indicator, and so on, which does not take into consideration power saving. That is, a wireless configuration is implemented, although the batteries need to be frequently replaced.

SUMMARY

In view of the above-described situations, the present disclosure provides a picking system that enables wireless communication and cordless power supply, that functions without the need for the operator carrying a predetermined device, and that can reduce the frequency of replacing the batteries or that can avoid the need for replacing the batteries by taking into consideration power saving.

According to an aspect of the disclosure, there is provided a wireless communicator-indicator for communicating with a management apparatus that manages progress in a picking operation, including an indication unit, a first wireless communication circuit, an operation accepting unit, a power supply circuit, a second wireless communication circuit, and a controller. The indication unit provides an indication for making an operator recognize a position of a picking target item. The first wireless communication circuit receives indication instruction information transmitted from the management apparatus by a radio wave, and records or outputs electronic information that reflects the indication instruction information by using energy of the received radio wave. The operation accepting unit accepts an operation reflecting completion of a picking operation for the picking target item by the operator. The power supply circuit supplies power. The second wireless communication circuit wirelessly transmits picking operation completion information to the management apparatus by using the power of the power supply circuit. The controller controls the indication unit and the second wireless communication circuit. The controller performs a process for causing the indication unit to provide an indication on the basis of the electronic information recorded or output by the first wireless communication circuit and a process for causing the second wireless communication circuit to transmit the picking operation completion information to the management apparatus on the basis of the operation accepted by the operation accepting unit.

DESCRIPTION OF THE EMBODIMENTS

Hereinafter, the present disclosure will be described in detail with reference to the drawings. The description given below is illustrative in all aspects and is not to be construed as restrictive.

First Embodiment

Figure 1:
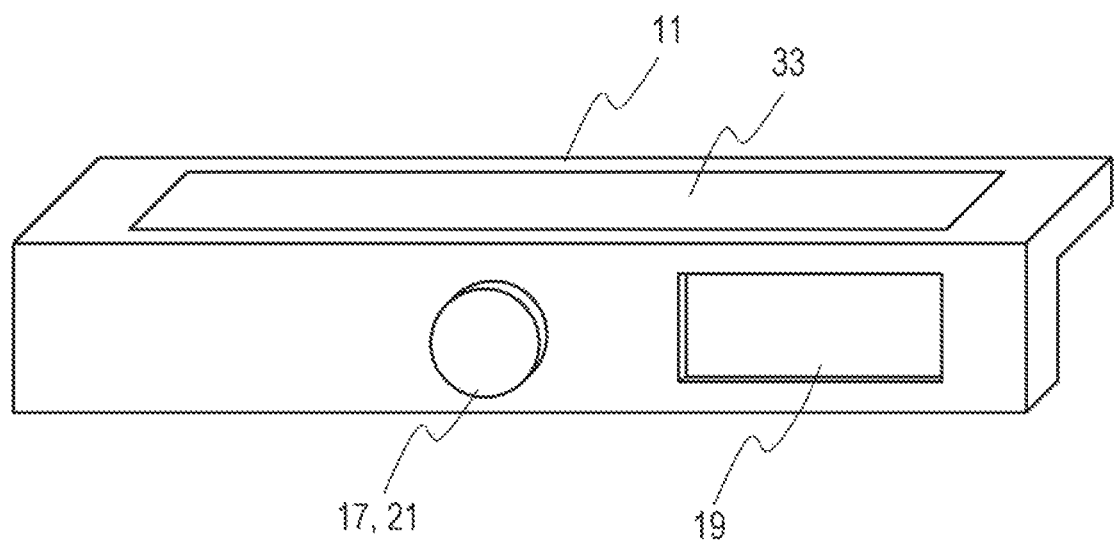
FIG. 1 is a diagram illustrating an external view of a wireless communicator-indicator according to a first embodiment.
Figure 2:
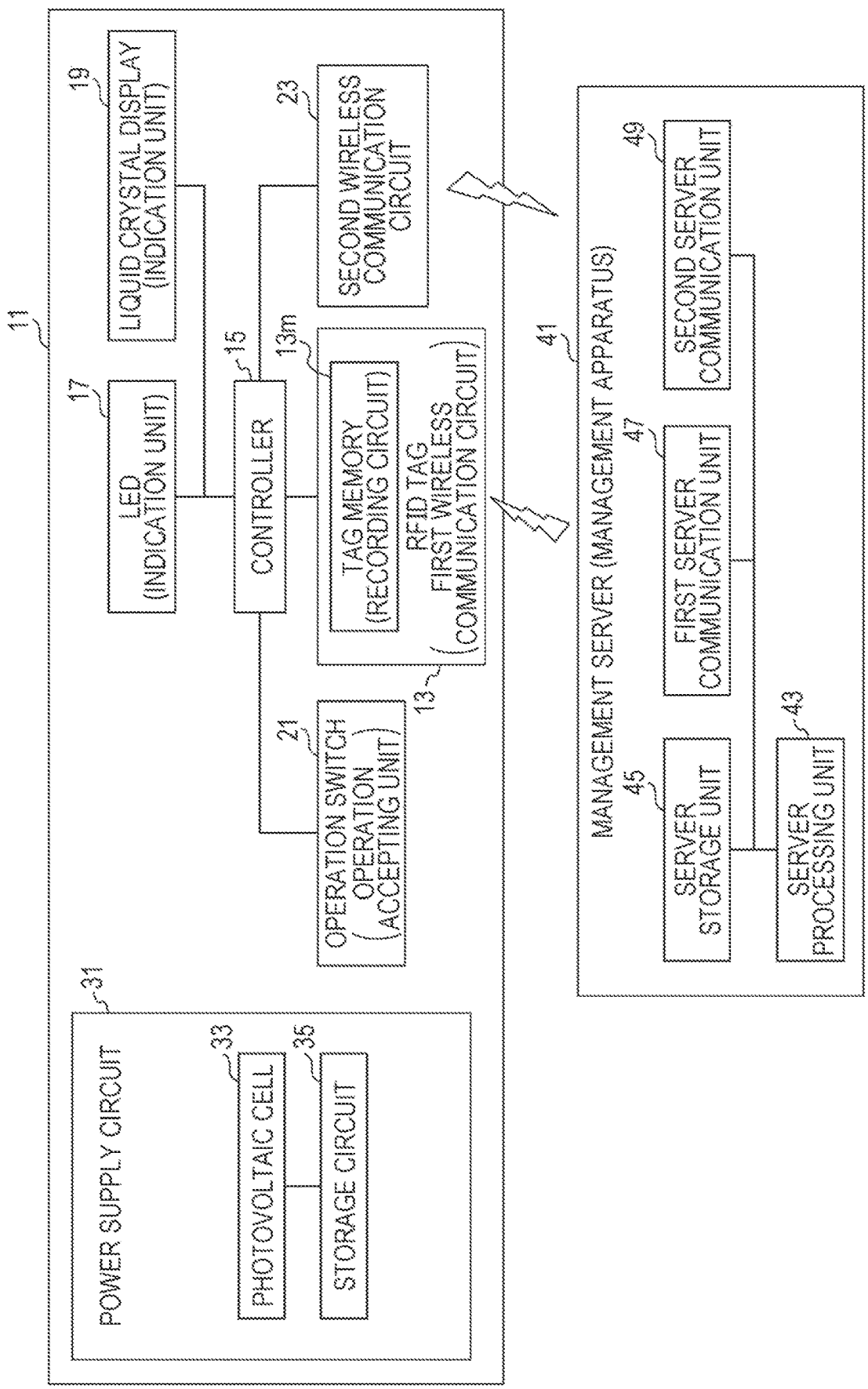
FIG. 2 is a block diagram illustrating an electrical configuration of the wireless communicator-indicator illustrated in FIG. 1.
Figure 3:
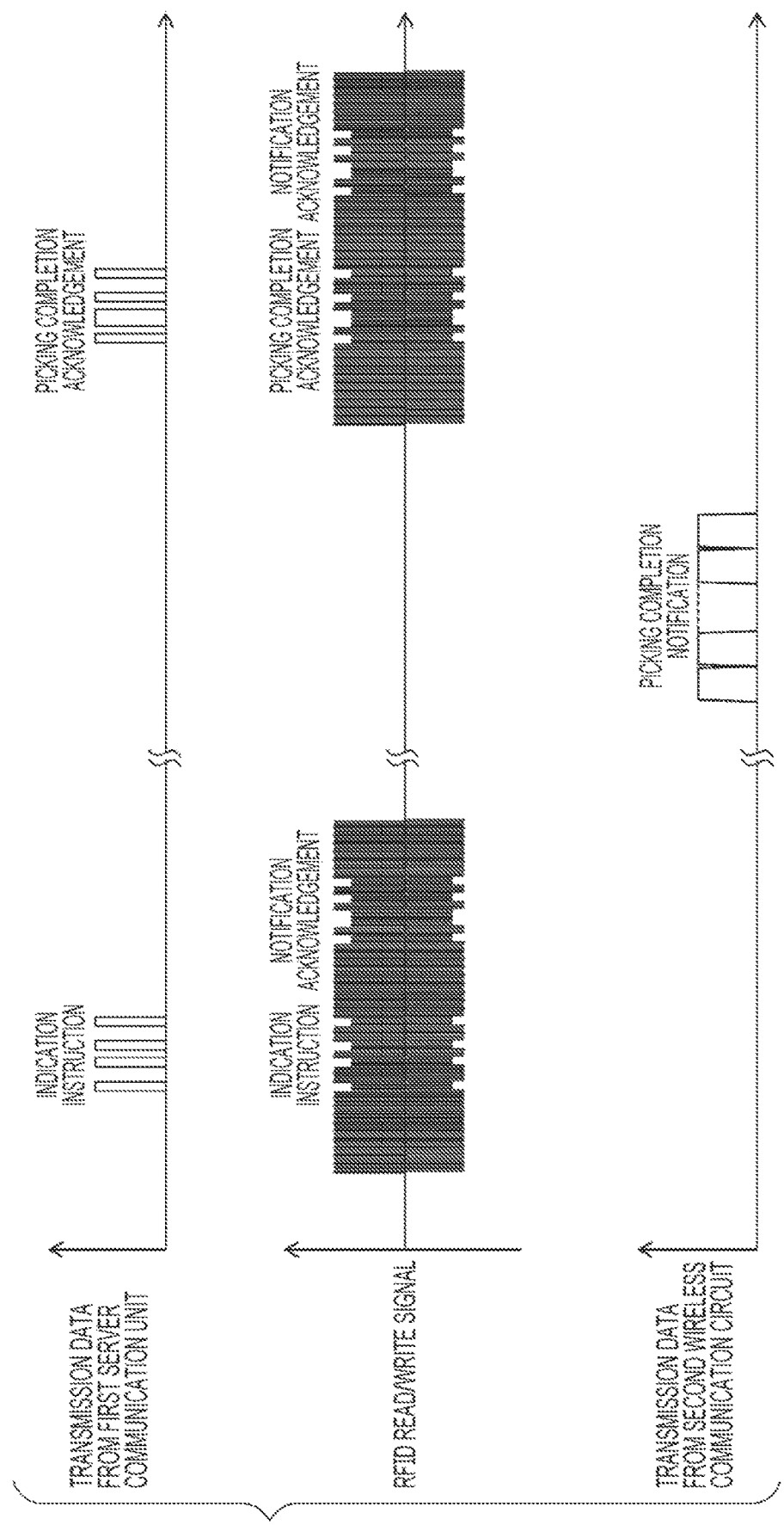
FIG. 3 is a diagram illustrating an example in which the wireless communicator-indicator illustrated in FIG. 1 transmits/receives information to/from a management server.
Figure 4:
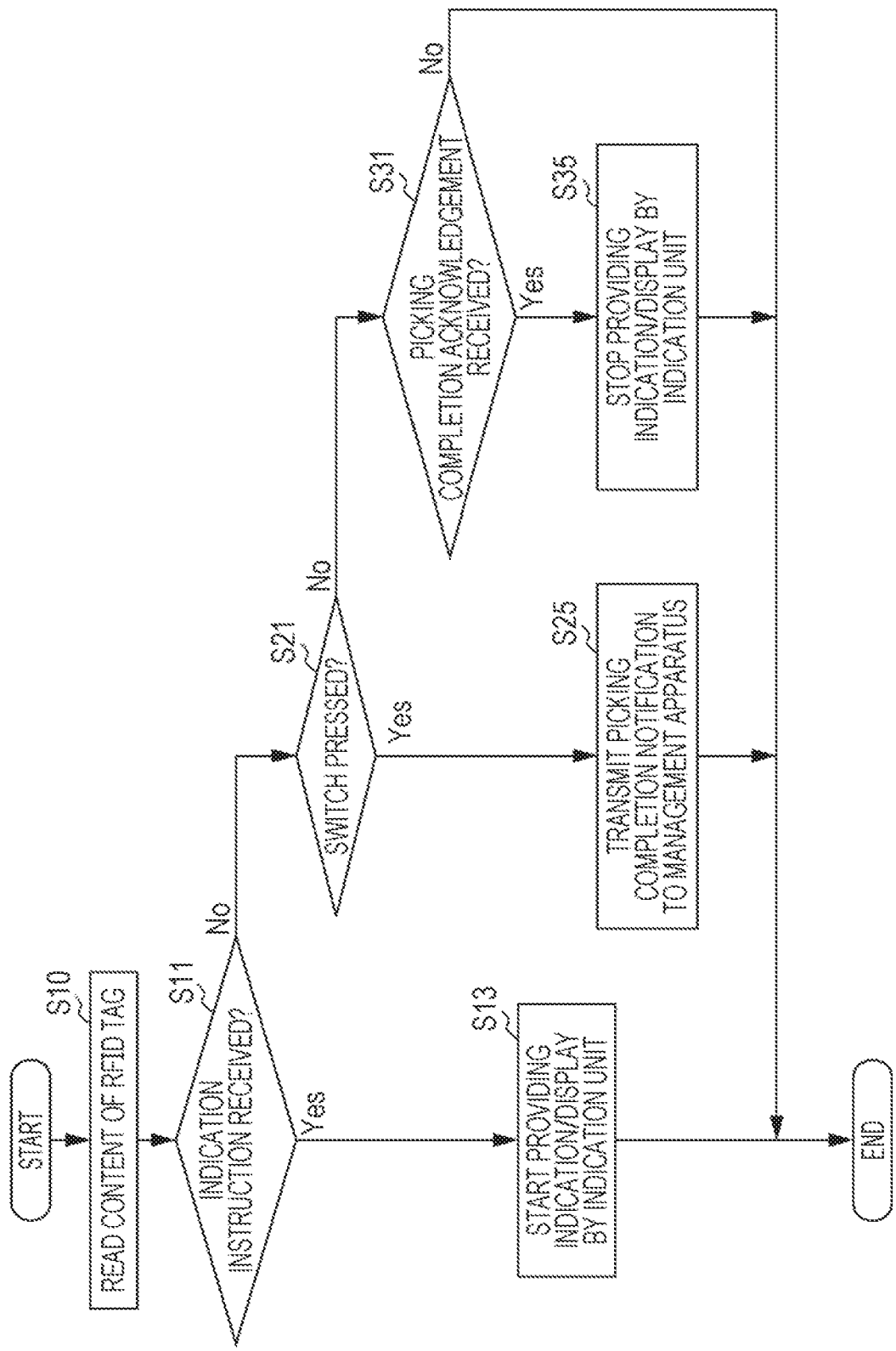
FIG. 4 is a flowchart illustrating a flow of a basic process that is performed by a controller of the wireless communicator-indicator illustrated in FIG. 2.

FIG. 1 is a diagram illustrating an external view of a wireless communicator-indicator 11 according to a first embodiment. FIG. 2 is a block diagram illustrating an electrical configuration of the wireless communicator-indicator 11 illustrated in FIG. 1. FIG. 3 is a diagram illustrating an example in which a controller of the wireless communicator-indicator 11 illustrated in FIG. 1 transmits/receives information to/from a management server. FIG. 4 is a flowchart illustrating a flow of a basic process that is performed by the controller of the wireless communicator-indicator 11 illustrated in FIG. 2.

As illustrated in FIG. 1, the wireless communicator-indicator 11 according to the first embodiment has a substantially L-shape external form and has an upper surface portion on which a photovoltaic cell 33 is disposed and a front surface portion on which a self-illuminating operation switch 21 illuminated with light emitted from a light emitting diode (LED) 17 is disposed. On the front surface portion, a liquid crystal display 19 is also disposed.

In a rack, picking target items are stored in accordance with the types of items. The wireless communicator-indicator 11 is disposed at each position corresponding to a corresponding one of the types of items in the rack.

As illustrated in FIG. 2, the wireless communicator-indicator 11 includes an RFID tag 13, a controller 15, the LED 17, the liquid crystal display 19, the operation switch 21, a second wireless communication circuit 23, and a power supply circuit 31. The RFID tag 13 includes a tag memory 13m as a recording circuit.

In the first embodiment, the RFID tag 13 corresponds to a first wireless communication circuit. The controller 15 is constituted by a microcomputer.

The LED 17 and the liquid crystal display 19 constitute an indication unit.

The operation switch 21 corresponds to an operation accepting unit, and more specifically, to a touch operation unit included in the operation accepting unit. The operation switch 21 is a push switch in the first embodiment. An operator touches the operation switch. 21 to operate the switch.

The second wireless communication circuit 23 corresponds to a second wireless communication circuit and performs wireless communication compliant with the IEEE 802.15.4 standard in the first embodiment.

The wireless communicator-indicator 11 includes the RFID tag 13 and the second wireless communication circuit 23 to enable wireless communication.

In the first embodiment, the power supply circuit 31 includes the photovoltaic cell 33 and a storage circuit 35. The storage circuit 35 stores power generated by the photovoltaic cell 33. The wireless communicator-indicator 11 includes the power supply circuit 31 to enable wireless power supply.

The wireless communicator-indicator 11 communicates with an external management server 41. The management server 41 corresponds to a management apparatus.

The management server 41 includes a server processing unit 43 constituted by a central processing unit (CPU) and so on, a server storage unit 45 constituted by a memory and so on, a first server communication unit 47, and a second server communication unit 49. The first server communication unit 47 wirelessly communicates with the RFID tag 13 of the wireless communicator-indicator 11. The second server communication unit 49 wirelessly communicates with the second wireless communication circuit 23 of the wireless communicator-indicator 11.

As illustrated in FIG. 3, in a case of transmitting an indication instruction (indication instruction information) to the wireless communicator-indicator 11, the server processing unit 43 transmits the indication instruction, which is transmission data, by a radio wave, which is a carrier wave, via the first server communication unit 47. In the first embodiment, a radio wave in the 900-MHz band, which is the UHF band, is used as the carrier wave to perform wireless communication. The above-described frequency band of the carrier wave is only an example and is not restrictive.

The indication instruction transmitted from the server processing unit 43 includes identification information unique to the wireless communicator-indicator 11 that is a transmission destination. The identification information matches unique identification information stored in advance in the tag memory 13m of the RFID tag 13 included in the wireless communicator-indicator 11 that is a transmission destination. The identification information is used to distinguish the wireless communicator-indicator 11 from other wireless communicator-indicators.

In FIG. 3, the RFID read/write signal represents the carrier wave modulated by communication data. As illustrated in FIG. 3, before communicating with the RFID tag 13 of the wireless communicator-indicator 11, the first server communication unit 47 first transmits only the carrier wave. When receiving the carrier wave, the RFID tag 13 stores the radio energy of the received carrier wave in a circuit included therein. The first server communication unit 47 continues transmitting the carrier wave for a predetermined period adequate for storing sufficient energy for subsequent communication by the RFID tag 13.

Thereafter, the first server communication unit 47 transmits an indication instruction, which is communication data, by the carrier wave. When recognizing and receiving the communication data, the RFID tag 13 returns a notification acknowledgement to the management server 41 by modulating the carrier wave. When receiving the notification acknowledgement returned after transmission, the first server communication unit 47 stops outputting the carrier wave.

As described above, transmission of an indication instruction from the management server 41 to the wireless communicator-indicator 11 is performed in bidirectional communication between the first server communication unit 47 and the RFID tag 13. The RFID tag 13 stores the radio energy of the carrier wave to receive an indication instruction and return a notification acknowledgement. On the basis of the content of the received communication data, the RFID tag 13 writes electronic information (data) to the tag memory 13m or updates electronic information stored in the tag memory 13m.

The controller 15 performs processing on the basis of the content of the received communication data.

To recognize reception of the communication data, the controller 15 successively refers to the tag memory 13m to see if newly written electronic information or updated electronic information is present.

Alternatively, to make the controller 15 recognize reception of the communication data, the RFID tag 13 may output a reference request signal or data to the controller 15. In response to the reference request from the RFID tag 13, the controller 15 refers to the electronic information stored in the tag memory 13m and performs processing on the basis of the electronic information.

When recognizing that the received communication data is an indication instruction, the controller 15 causes the LED 17, which constitutes the indication unit, to emit light, thereby informing the operator of the position of the picking target item.

The indication instruction includes information about the number of picking target items to be picked. The controller 15 causes the liquid crystal display 19, which constitutes the indication unit, to display the number of picking target items to be picked.

At the time when picking for the number of items displayed on the liquid crystal display 19 is completed, the operator presses the operation switch 21 to inform the management server 41 of completion of target item picking. When the operation switch 21 accepts the operation, the controller 15 causes the second wireless communication circuit 23 to transmit picking operation completion information (picking completion notification). The second wireless communication circuit 23 transmits communication data of the picking completion notification to the management server 41. The communication data of the picking completion notification includes the unique identification information stored in advance in the tag memory 13m.

The second server communication unit 49 of the management server 41 receives the picking completion notification from the wireless communicator-indicator 11. The server processing unit 43 recognize that target item picking corresponding to the indication instruction is completed. In response to the received picking completion notification, the server processing unit 43 causes the first server communication unit 47 to transmit a picking completion acknowledgement.

The picking completion acknowledgement transmitted from the first server communication unit 47 is received by the RFID tag 13 of the wireless communicator-indicator 11. When receiving the picking completion acknowledgement, the RFID tag 13 returns a notification acknowledgement. This notification acknowledgement is returned using a procedure similar to the procedure used in the case of receiving an indication instruction.

When receiving the picking completion acknowledgement, the controller 15 of the wireless communicator-indicator 11 causes the LED 17 to stop light emission and causes the liquid crystal display 19 to stop display.

The wireless communicator-indicators 11 are disposed for the respective different types of picking target items. The management server 41 transmits an indication instruction to the wireless communicator-indicators 11, which correspond to the different types of picking target items, to inform the operator of the picking target item. When receiving a picking completion notification from the wireless communicator-indicator 11 that corresponds to the picking target item, the management server 41 transmits a picking completion acknowledgement to the wireless communicator-indicator 11 to stop providing the indication.

With the procedure described above, the management server 41 manages the progress in picking operations.

FIG. 4 illustrates a flow of a basic process in processing that is performed by the controller 15. The process illustrated in FIG. 4 is repeatedly performed at predetermined time intervals. As illustrated in FIG. 4, the controller 15 reads the content of the tag memory 13m from the RFID tag 13 (step S10) and determines whether the RFID tag 13 receives data (step S11). When the RFID tag 13 receives communication data that includes identification information the same as identification information stored in advance in the tag memory 13m, the RFID tag 13 allows writing (including rewriting) of data based on the communication data to the tag memory 13m and reading of the data from the tag memory 13m.

If the controller 15 determines that an indication instruction is received as a result of reading and determination of the data stored in the tag memory 13m (Yes in step S11), the controller 15 causes the LED 17 and the liquid crystal display 19, which constitute the indication unit, to start providing an indication, that is, start display (step S13), and the process ends.

If it is determined that an indication instruction is not received as a result of determination in step S11 described above (No in step S11), the controller 15 determines whether the operation switch 21 is pressed (step S21). If the operation switch 21 is pressed (Yes in step S21), the controller 15 causes the second wireless communication circuit 23 to transmit a picking completion notification (step S25), and the process ends.

If it is determined that the operation switch 21 is not pressed as a result of determination in step S21 (No in step S21), the controller 15 determines whether a picking completion acknowledgement is received on the basis of the content of the RFID tag 13 read in step S10 described above (step S31). If a picking completion acknowledgement is received (Yes in step S31), the controller 15 causes the LED 17 and the liquid crystal display 19, which constitute the indication unit, to stop providing the indication (step S35), and the process ends.

If it is determined that a picking completion acknowledgement is not received as a result of determination in step S31 (No in step S31), the process ends without any processing.

The flow of the basic process that is performed by the controller 15 is as described above.

Second Embodiment

In addition to the basic process described in the first embodiment, some additional processes are described below.

Figure 5:
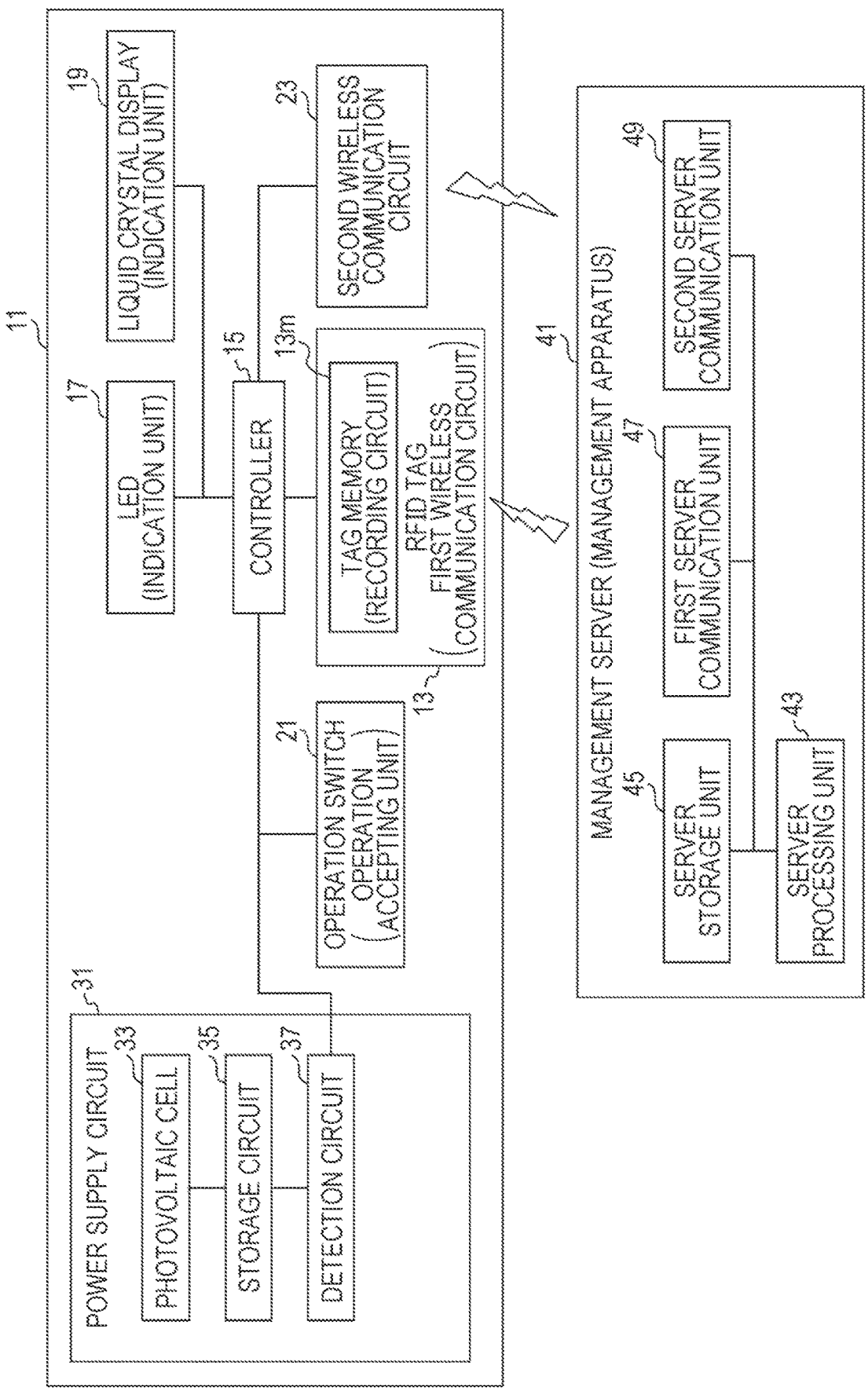
FIG. 5 is a block diagram illustrating a configuration of a power supply circuit in a second embodiment different from that of the wireless communicator-indicator illustrated in FIG. 2.

FIG. 5 is a block diagram illustrating a configuration of the power supply circuit 31 that is different from that of the wireless communicator-indicator 11 illustrated in FIG. 2. As illustrated in FIG. 5, the power supply circuit 31 in the second embodiment further includes a detection circuit 37 that detects the amount of power stored in the storage circuit 35 so as to allow the controller 15 to check the amount of power stored in the storage circuit 35.

Before transmitting a picking completion notification via the second wireless communication circuit 23, the controller 15 checks to see if an amount of power sufficient for transmission is stored in the storage circuit 35. The amount of power for transmission is determined in advance on the basis of the design or measurement and is used as a threshold. If the amount of power in the storage circuit 35 detected by the detection circuit 37 exceeds the threshold, the second wireless communication circuit 23 transmits a picking completion notification. Otherwise, the second wireless communication circuit 23 waits for power to be generated by the photovoltaic cell 33 and stored in the storage circuit 35 and transmits a picking completion notification when the amount of stored power exceeds the threshold.

In a case where power stored in the storage circuit 35 is exhausted during transmission of a picking completion notification, the management server 41 fails to successfully receive the picking completion notification. Therefore, the management server 41 does not transmit a picking completion acknowledgement to the RFID tag 13.

In a case where the RFID tag 13 does not receive a picking completion acknowledgement within a predetermined period from transmission of a picking completion notification, the controller 15 retransmits a picking completion notification.

Figure 6:
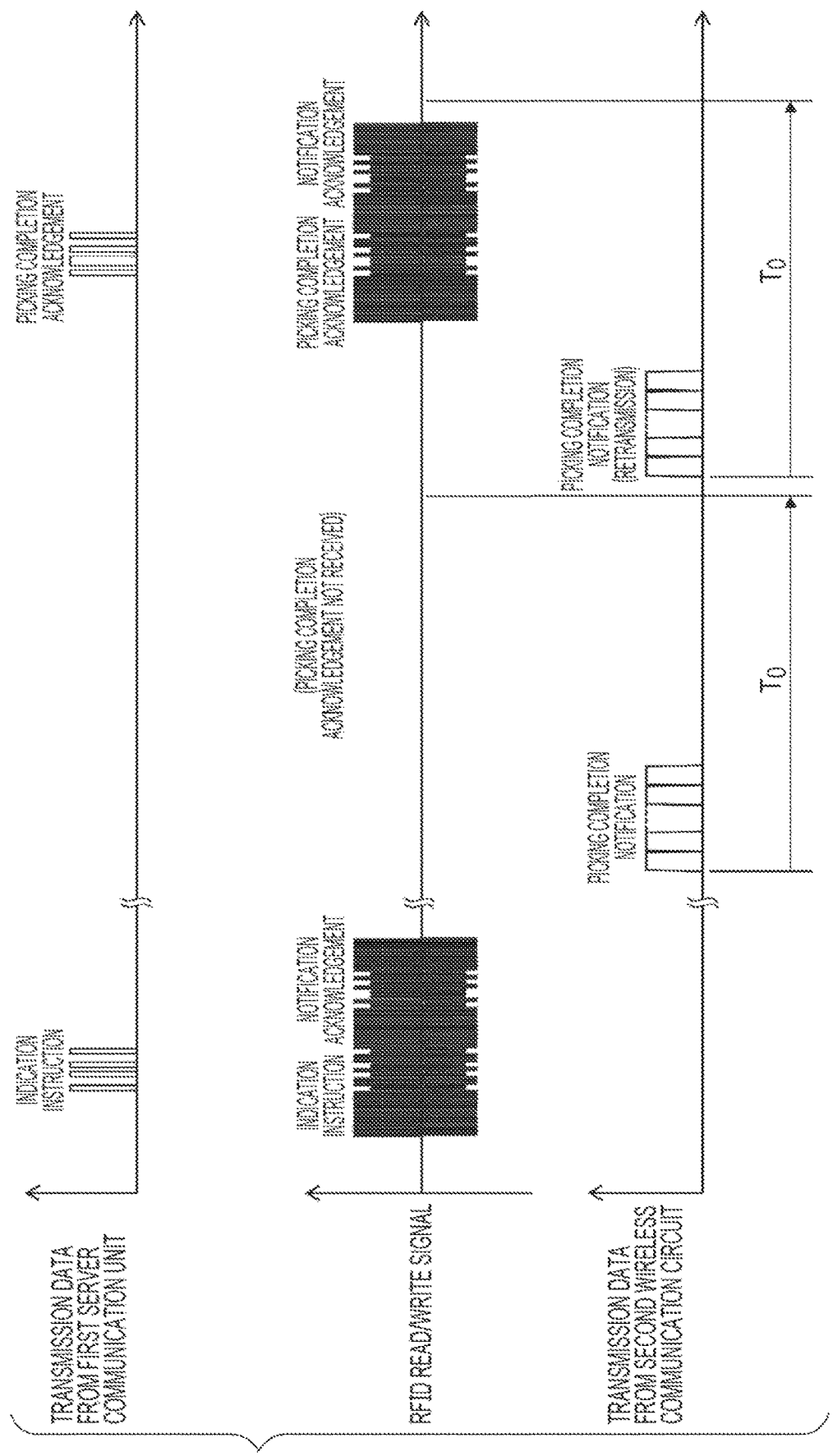
FIG. 6 is a diagram illustrating an example in which a picking completion notification is retransmitted in communication between the wireless communicator-indicator and the management server in the second embodiment.

FIG. 6 is a diagram illustrating an example in which a picking completion notification is retransmitted in communication between the wireless communicator-indicator 11 and the management server 41 in the second embodiment. As illustrate in FIG. 6, in a case where the RFID tag 13 does not receive a picking completion acknowledgement within a predetermined period $T_0$ from transmission of a picking completion notification, the controller 15 retransmits a picking completion notification.

If the retransmitted picking completion notification is successfully received by the management server 41, the RFID tag 13 receives a picking completion acknowledgement from the management server 41 within the period $T_0$ from retransmission. On the basis of the reception, the controller 15 recognizes that retransmission need not be performed any more.

Figure 7:
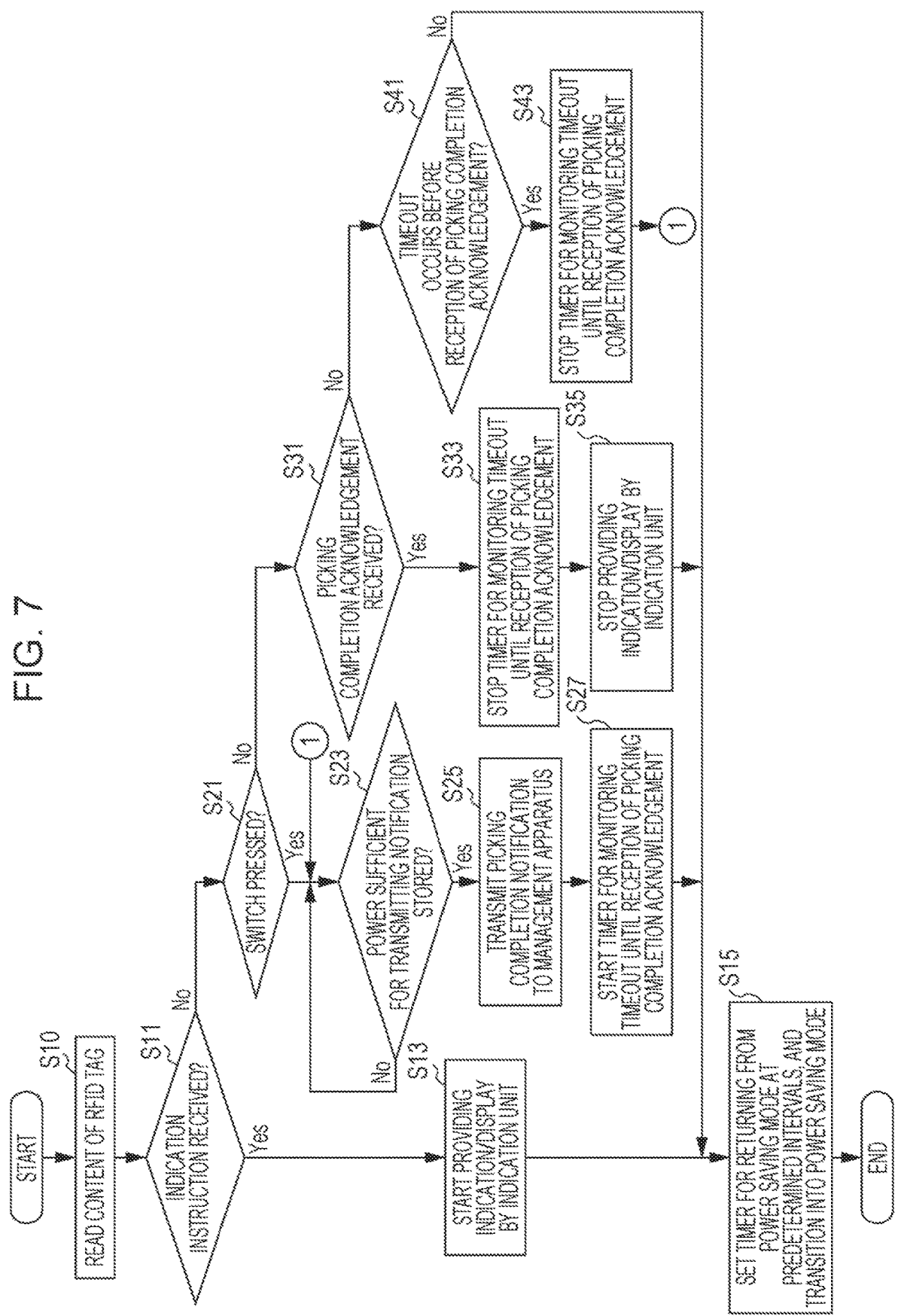
FIG. 7 is a flowchart illustrating another example process that is performed by the controller of the wireless communicator-indicator in the second embodiment.

FIG. 7 is a flowchart illustrating another example process that is performed by the controller 15 of the wireless communicator-indicator 11 in the second embodiment.

In the embodiment of the flowchart illustrated in FIG. 7, the microcomputer, which constitutes the controller 15, performs the process at predetermined intervals and transitions into a power saving mode in a standby period between the successive processes. The microcomputer uses a timer included therein to control the successive processes so as to be performed with an appropriate time interval therebetween.

As illustrated in FIG. 7, the controller 15 reads the content of the tag memory 13m from the RFID tag 13 (step S10) and determines whether the RFID tag 13 receives data (step S11).

If the controller 15 determines that an indication instruction is received as a result of reading and determination of the data stored in the tag memory 13m (Yes in step S11), the controller 15 causes the LED 17 and the liquid crystal display 19, which constitute the indication unit, to start providing an indication, that is, start display (step S13).

Thereafter, the flow proceeds to step S15. The controller 15 sets the timer to the time at which the process is to be started next, and transitions into a power saving mode (step S15), and the process ends. At the time to which the timer is set, the controller 15 returns from the power saving mode and performs the process illustrated in FIG. 7 again.

If it is determined that an indication instruction is not received as a result of determination in step S11 described above (No in step S11), the controller 15 determines whether the operation switch 21 is pressed (step S21). If the operation switch 21 is pressed (Yes in step S21), the controller 15 checks to see if an amount of power sufficient for transmitting a picking completion notification is stored in the storage circuit 35 (step S23). If the power is not sufficient (No in step S23), the controller 15 waits for power to be generated by the photovoltaic cell 33 and stored in the storage circuit 35.

If an amount, of power sufficient, for transmitting a picking completion notification is stored in the storage circuit 35 (Yes in step S23), the controller 15 causes the second wireless communication circuit 23 to transmit a picking completion notification (step S25). The controller 15 sets a timer for monitoring a timeout until reception of a picking completion acknowledgement and causes the timer to start measuring the time (step S27). Thereafter, the flow proceeds to step S15 described above, and the controller 15 sets the timer described above and transitions into a power saving mode.

If it is determined that the operation switch 21 is not pressed as a result of determination in step S21 described above (No in step S21), the controller 15 determines whether a picking completion acknowledgement is received on the basis of the content of the RFID tag 13 read in step S10 described above (step S31).

If a picking completion acknowledgement is received (Yes in step S31), the controller 15 stops the timer for monitoring a timeout until reception of a picking completion acknowledgement (step S33). This timer is the timer starting measuring the time in step S27 described above. The controller 15 causes the LED 17 and the 1 crystal display 19, which constitute the indication unit, to stop providing the indication (step S35). Thereafter, the flow proceeds to step S15 described above, and the controller 15 sets the timer and transitions into a power saving mode.

If it is determined that a picking completion acknowledgement is not received as a result of determination in step S31 (No in step S31), the controller 15 determines whether the timer tar monitoring reception of a picking completion acknowledgement detects a timeout (step S41). This timer is the timer that starts measuring the time in step S27 described above.

If a timeout occurs before a picking completion acknowledgement is received (Yes in step 341), the controller 15 stops the timer for monitoring reception of a picking completion acknowledgement (step 343), the flow proceeds to step S23 described above, and a picking completion notification is retransmitted.

On the other hand, if it is determined that a timeout does not yet occur as a result of determination in step S41 (No in step S41), the flow proceeds to step S15 described above, and the controller 15 sets the timer and transitions into a power saving mode.

The process that is performed by the controller 15 is as described above.

Third Embodiment

In a third embodiment, the controller 15 causes the LED 17 and the liquid crystal display 19 to stop providing an indication in response to an operation accepted by the operation switch 21. The LED 17 and the liquid crystal display 19 stop providing an indication at a time point earlier than in the first embodiment in which the LED 17 and the liquid crystal display 19 stop providing an indication in response to reception of a picking completion acknowledgement. Accordingly, the period from the operation for picking completion to the stop of providing an indication can be further reduced, and the power of the power supply circuit 31 can be further saved.

Fourth Embodiment

In the above-described embodiments, the first wireless communication circuit receives a picking completion acknowledgement. In the fourth embodiment, the second wireless communication circuit 23 receives a picking completion acknowledgement. That is, the management server 41 transmits a picking completion acknowledgement using the second server communication unit 49, and the wireless communicator-indicator 11 receives the picking completion acknowledgement using the second wireless communication circuit 23.

In the process corresponding to step S25 in FIG. 7 described above, the controller 15 causes the second wireless communication circuit 23 to transmit a picking completion notification to the management server 41, and thereafter, enters a reception waiting state where the controller 15 waits for a response of picking completion acknowledgement, which is a process corresponding to step S27 in FIG. 7 described above. When successfully receiving the picking completion notification, the second server communication unit 49 immediately transmits a picking completion acknowledgement to the second wireless communication circuit 23. When the second wireless communication circuit 23 receives the picking completion acknowledgement (corresponding to Yes in step S31 in FIG. 7), the controller 15 exits the reception waiting state (corresponding to step S33 in FIG. 7).

On the other hand, if a picking completion acknowledgement is not received within a predetermined period after transmission of the picking completion notification in the process corresponding to step S25 in FIG. 7 described above (corresponding to Yes in step S41 in FIG. 7), the controller 15 causes the second wireless communication circuit 23 to retransmit a picking completion notification (corresponding to step S43 in FIG. 7).

Accordingly, the first server communication unit 47 is allowed to (jive an indication instruction for the next picking target item before transmitting a picking completion acknowledgement. As a result, in the picking system, a communication bottleneck is suppressed, processing is smoothly performed, and performance is increased.

Fifth Embodiment

In the first embodiment, the wireless communicator-indicator 11 includes the liquid crystal display 19, which constitutes the indication unit, in addition to the LED 17 to display the number of items to be picked, that is, the number of picking target items of the same type to be picked, on the liquid crystal display 19. After the operator has picked the displayed number of items, the operator touches the operation switch 21 to inform the management server 41 of picking operation completion.

In the fifth embodiment, it is assumed that the operator operates the operation switch 21 each time the operator picks one picking target item.

The number of items to be picked displayed on the liquid crystal display 19 is decremented by 1 each time the operation switch 21 is operated. This can avoid a situation where the operator miscounts the number of picked items.

Alternatively, the LED 17 may stop providing the indication only after the operator operates the operation switch 21 a number of times equal to the number of items to be picked to avoid the need for the 1 crystal display 19.

Sixth Embodiment

The first embodiment assumes that one wireless, communicator-indicator 11 is disposed for one type of picking target item.

The sixth embodiment describes a form in which one wireless communicator-indicator 11 can handle a plurality of types of picking target items.

Figure 8:
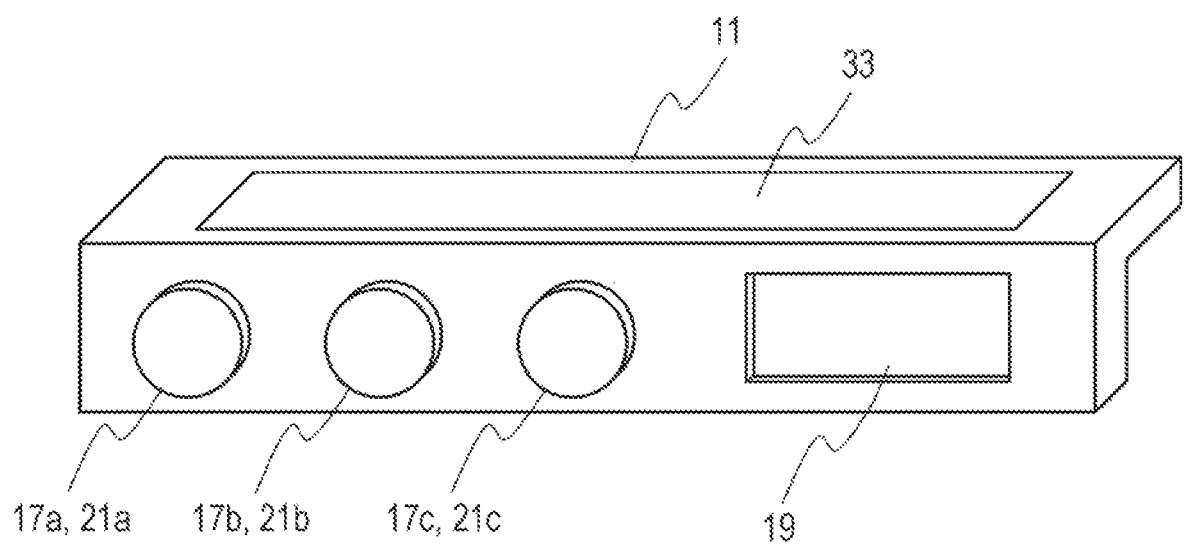
FIG. 8 is a diagram illustrating an external view of the wireless communicator-indicator in a sixth embodiment having a form different from that illustrated in FIG. 1.
Figure 9:
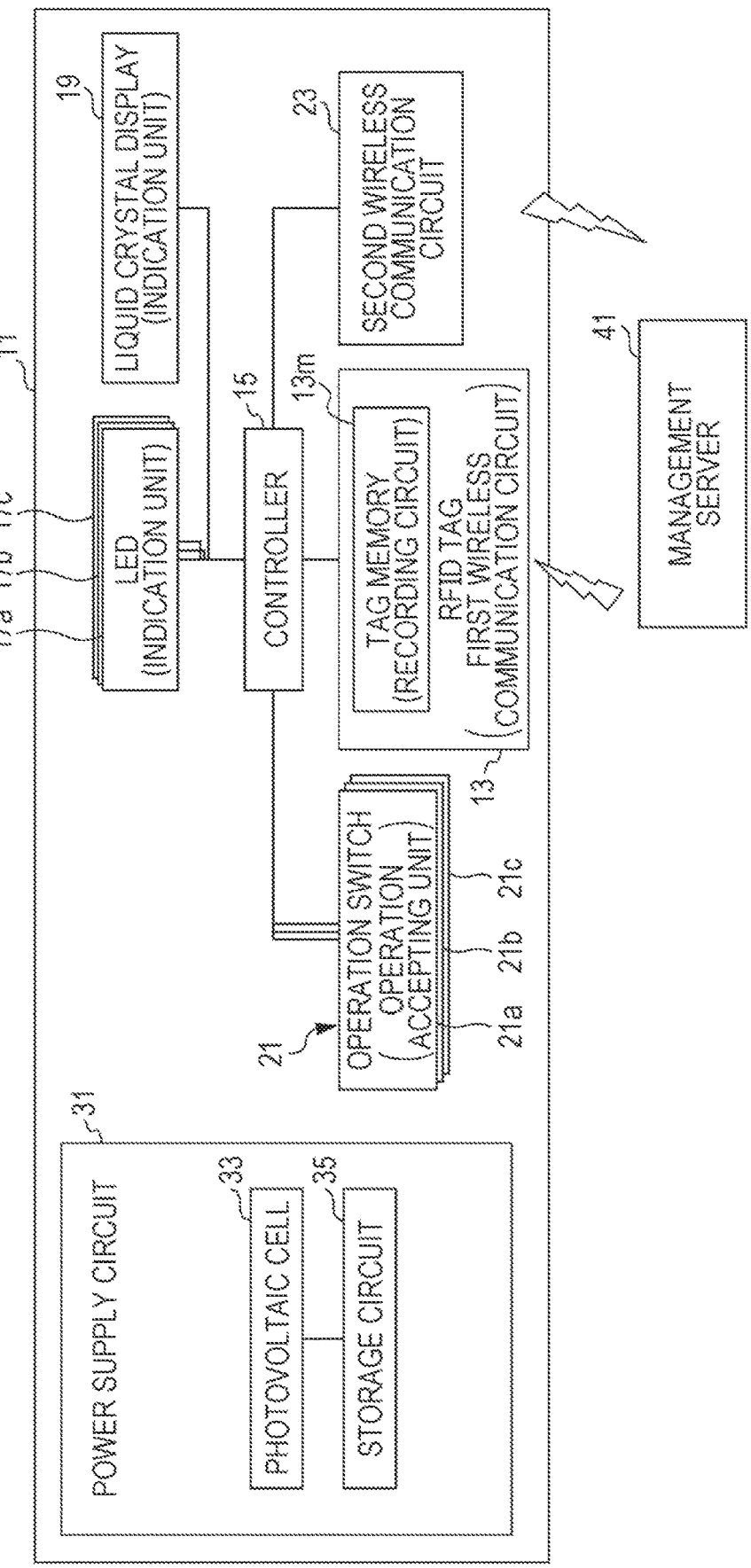
FIG. 9 is a block diagram illustrating an electrical configuration of the wireless communicator-indicator illustrated in FIG. 8 in the sixth embodiment.

FIG. 8 is a diagram illustrating an external view of the wireless communicator-indicator 11 in the sixth embodiment different from that illustrated in FIG. 1. FIG. 9 is a block diagram illustrating a different electrical configuration of the wireless communicator-indicator 11 illustrated in FIG. 8.

As illustrated in FIG. 8 and FIG. 9, the wireless communicator-indicator 11 according to the sixth embodiment includes three operation switches 21a, 21b, and 21c and three LEDs 17a, 17b, and 17c corresponding to the respective operation switches. The liquid crystal display 19 displays content corresponding to each of the three types of picking target items.

Different pieces of identification information may be assigned to the three LEDs 17a, 17b, and 17c and the three operation switches 21a, 21b, and 21c. In this case, three RFID tags 13 need to be provided so as to correspond to the respective pieces of identification information. Alternatively, identification information may be configured to include two layers in which the upper layer is used for information unique to the wireless communicator-indicator 11 and the lower layer is used to identify one of the plurality of indication units and one of the operation switches in the same wireless communicator-indicator 11.

In the form in which identification information is layered, the RFID tag 13 needs to store in advance only the upper-layer identification information and determine whether to receive communication data, that is, determine whether communication data is addressed thereto on the basis of the upper-layer identification information. The controller 15 needs to read data in the tag memory 13m of the RFID tag 13 and determine one of the indication units that is to be involved in the communication on the basis of the lower-layer identification information included in the communication data.

Although the example case of handling three types of picking target items is illustrated in FIG. 6, a person skilled in the art can easily understand a form in which a plurality of types of picking target items other than three types of picking target items are handled on the basis of the example case.

The wireless communicator-indicator 11 is a device for making the operator recognize the position of the picking target item. Therefore, it is not desirable to cause one wireless communicator-indicator 11 to handle a number of types of picking target items. However, in a case where, for example, three types of picking target items are stored side by side on the same shelf in a rack so that the correspondences between the types of picking target items and the respective operation switches 21 are clear to the operator, practicality is not compromised. Specifically, in a case where picking target items are small items, such as screws or nuts, and the actual size of the wireless communicator-indicator 11 is larger than the size of each place in which picking target items of a corresponding type are stored, the configuration according to the sixth embodiment is practical.

Seventh Embodiment

As described in the description of FIG. 3, when recognizing and receiving communication data, the RFID tag 13 returns a notification acknowledgement to the management server 41 by modulating the carrier wave. When receiving the notification acknowledgement returned after transmission, the first server communication unit 47 stops outputting the carrier wave.

Otherwise, in a case where a notification acknowledgement is not returned in response to transmission from the first server communication unit 47, the management server 41 may retransmit the communication data as described below.

Figure 10:
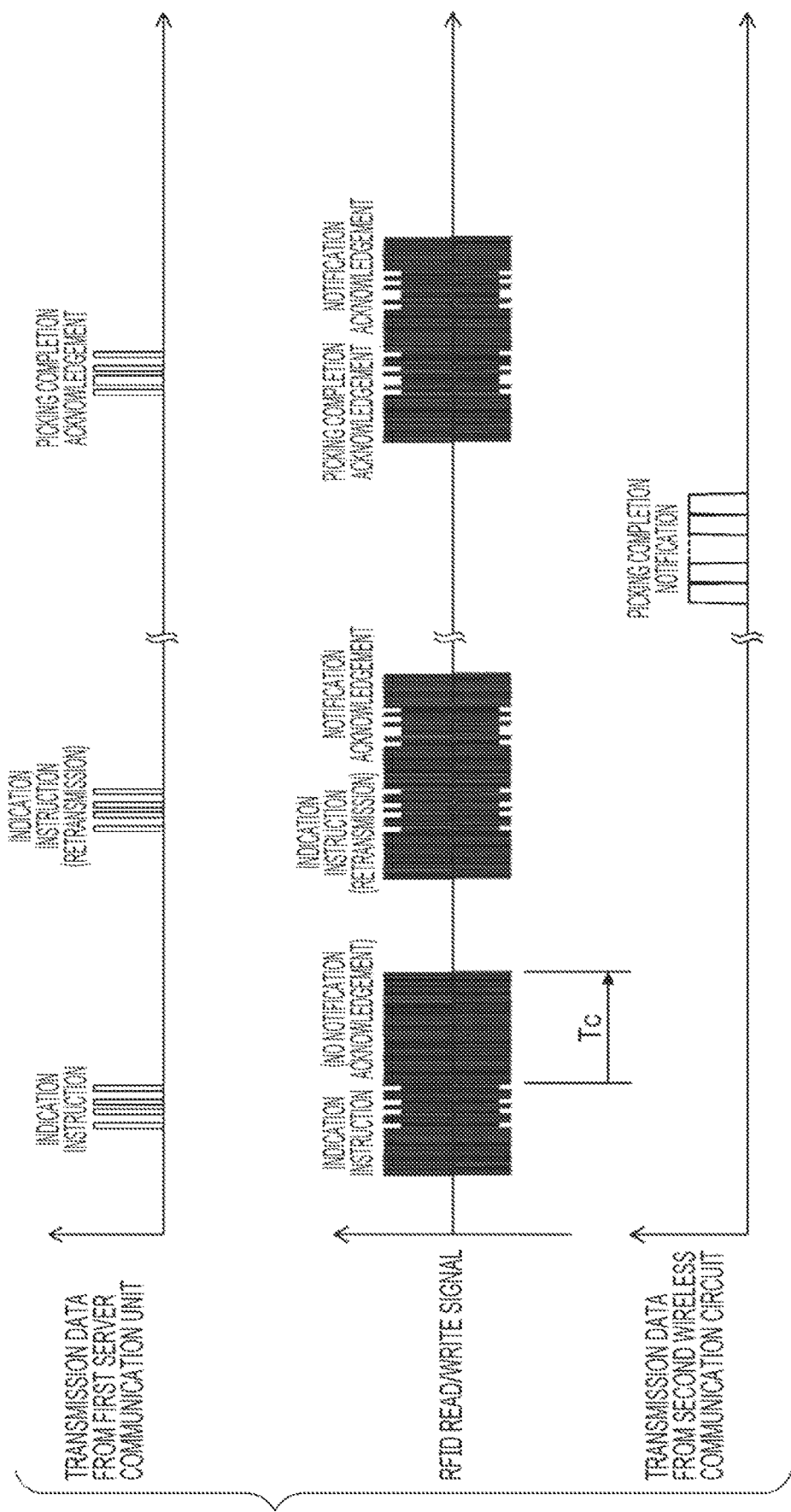
FIG. 10 is a diagram illustrating an example in which indication instruction information is retransmitted in communication between the wireless communicator-indicator and the management server in a seventh embodiment.

FIG. 10 is a diagram illustrating an example in which the management server 41 retransmits communication data in communication between the wireless communicator-indicator 11 and the management server 41 in the seventh embodiment. Although the example illustrated in FIG. 10 is a case where, for example, an indication instruction is retransmitted as communication data, not only an indication instruction but also any communication data that is transmitted from the first server communication unit 47 needs to be transmitted using a similar procedure.

As illustrated in FIG. 10, in a case where a notification acknowledgement is not returned from the RFID tag 13 of the transmission destination within a predetermined period Tc after transmission of data, the first server communication unit 47 temporarily stops outputting the carrier wave and retransmits the data. The retransmission is performed using a procedure similar to the procedure used in the first transmission. When the retransmission is successful and a notification acknowledgement is returned from the RFID tag 13 of the transmission destination, the first server communication unit 47 stops outputting the carrier wave.

In the example illustrated in FIG. 10, an indication instruction is retransmitted. When the RFID tag 13 receives the retransmitted indication instruction and returns a notification acknowledgement, an indication is provided on the wireless communicator-indicator 11. Communication performed thereafter is similar to that illustrated in FIG. 3. That is, when the operator finishes their picking operation and operates the operation switch 21, a picking completion notification is transmitted to the management server 41, and the management server 41 returns a picking completion acknowledgement in response to the notification.

Eighth Embodiment

In an eighth embodiment, a description is given of the power supply circuit 31 having a different form.

Figure 11:
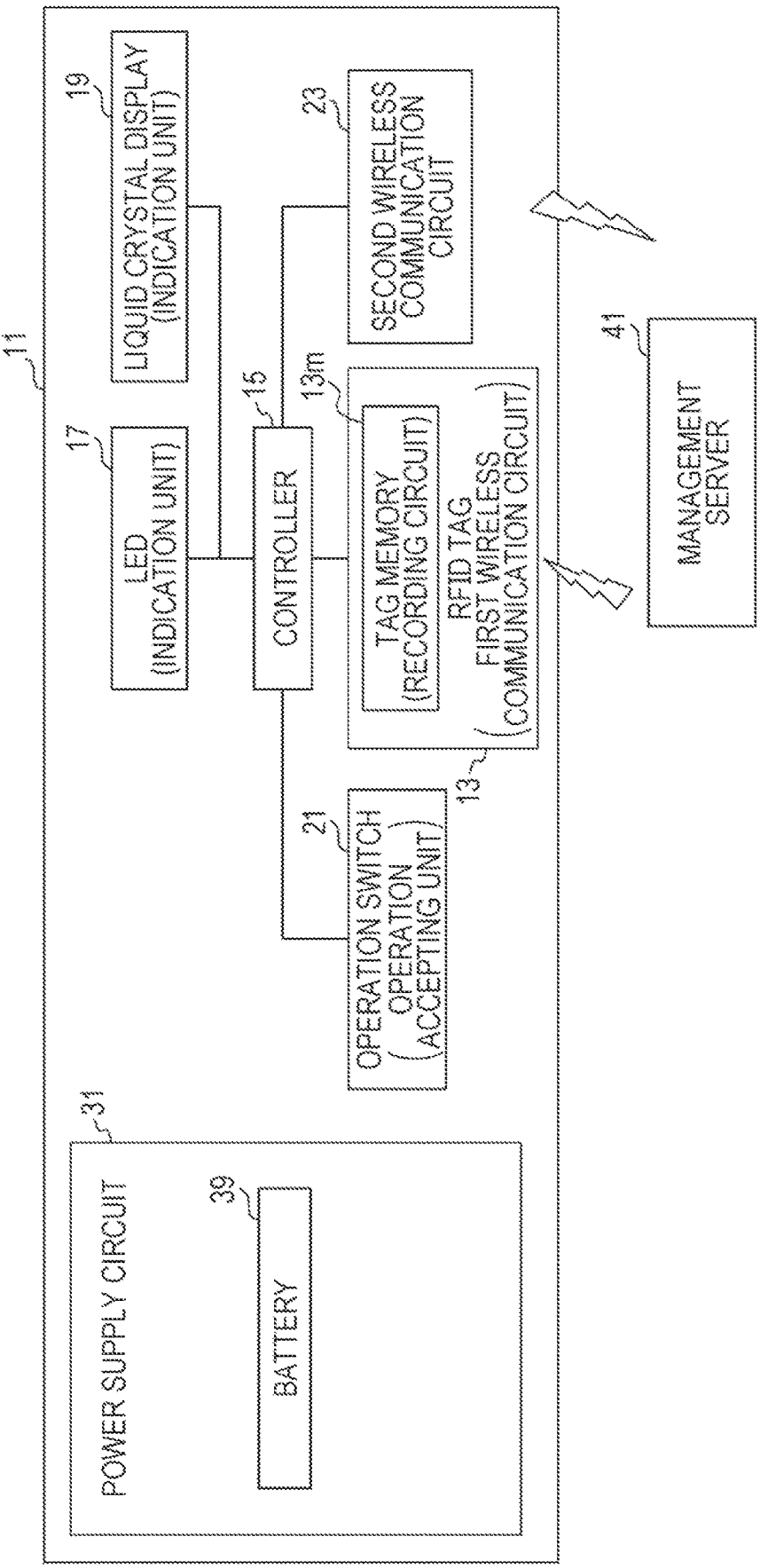
FIG. 11 is a block diagram illustrating a configuration of the power supply circuit in an eighth embodiment different from that of the wireless communicator-indicator illustrated in FIG. 2 and that illustrated in FIG. 5.

FIG. 11 is a block diagram illustrating the wireless communicator-indicator 11 according to the eighth embodiment and illustrates the power supply circuit 31 having a configuration different from that of the wireless communicator-indicator 11 illustrated in FIG. 2. As illustrated in FIG. 11, the power supply circuit 31 in the eighth embodiment includes a battery 39 and supplies power stored in the battery 39. The power supply circuit 31 includes no photovoltaic cell, and therefore, does not generate power. Accordingly, the battery 39 needs to be replaced before the power stored in the battery 39 is exhausted.

However, the indication unit, which is constituted by the LED 17 and the liquid crystal display 19, included in the wireless communicator-indicator 11 according to the eighth embodiment is a low-power-consumption device, and the second wireless communication circuit 23 is a wireless communication circuit compliant with the IEEE 802.15.4 standard intended to achieve lower power consumption. The RFID tag 13 operates without power supplied from the power supply circuit 31.

Accordingly, the wireless communicator-indicator 11 is configured by taking into consideration power saving, and the battery 39 need not be frequently replaced even if the photovoltaic cell 33 is not included.

As described above, one aspect of the present disclosure is as follows.

(i) A wireless communicator-indicator according to one aspect of the present disclosure is a wireless communicator-indicator for communicating with a management apparatus that manages progress in a picking operation, including: an indication unit that provides an indication for making an operator recognize a position of a picking target item; a first wireless communication circuit that receives indication instruction information transmitted from the management apparatus by a radio wave, and records or outputs electronic information that reflects the indication instruction information by using energy of the received radio wave; an operation accepting unit that accept an operation reflecting completion of a picking operation for the picking target item by the operator; a power supply circuit that supplies power; a second wireless communication circuit that wirelessly transmits picking operation completion information to the management apparatus by using the power of the power supply circuit; and a controller that controls the indication unit and the second wireless communication circuit. The controller per a process for causing the indication unit to provide an indication on the basis of the electronic information recorded or output by the first wireless communication circuit and a process for causing the second wireless communication circuit to transmit the picking operation completion information to the management apparatus on the basis of the operation accepted by the operation accepting unit.

In the present disclosure, the indication unit sends a signal (indication) to the operator, and the signal makes the operator recognize the position of the picking target item. Examples of a specific form of this indication Include an indication using photoelectric devices, such as the LED and the liquid crystal display described in the above-describes embodiments. However, not only photoelectric devices but also any mechanical device or other types of devices may be used. Any devices or forms including a from in which a signal is visually sent and a form in which a signal is sent in an auditory manner using sound, speech, and so on may be used as long the devices or forms can make the operator recognize the position of the target item.

The indication instruction information is information for the management apparatus to instruct the indication unit to provide an indication. The management apparatus is typically a computer including a CPU and a wireless communication interface. The indication instruction information is specific communication data that is transmitted to the wireless communicator-indicator including the indication unit by the CPU via the wireless communication interface. The first wireless communication circuit included in the wireless communicator-indicator recognizes the specific communication data as an indication instruction that is given to the indication unit, and the controller of the wireless communicator-indicator causes the indication unit to provide an indication in accordance with the instruction.

The communication data from the management apparatus is transmitted from a radio transmitter of the management apparatus by emitting a radio wave. The first wireless communication circuit included in the wireless communicator-indicator operates by the energy of the emitted radio wave, receives the communication data transmitted by the radio wave, and records or outputs electronic information.

The management server in the embodiments described above corresponds to the management apparatus of the present disclosure, and the RFID tag in the embodiments corresponds to the first wireless communication circuit of the present disclosure. Typically, the RFID tag includes a built-in memory device.

The wireless communication interface included in the management apparatus corresponds to the first server communication unit and the second server communication unit in the embodiments. The radio transmitter of the management apparatus is included in the first server communication unit in the embodiments or externally attached to the first server communication unit.

The operation accepting unit is a unit that accepts operations by the operator. The operation switch in the embodiments described above corresponds to the operation accepting unit of the present disclosure. However, the operation accepting unit is not limited to the operation switch and may be in any form, that is, may be any unit with which the operator can trigger the controller to transmit the picking operation completion information.

Further, the power supply circuit is a circuit that generates or stores power and externally supplies the power. Examples of the specific form of the power supply circuit include the combination of the photovoltaic cell and the storage circuit or the battery in the embodiments described above. The wireless communicator-indicator of the present disclosure enables cordless power supply, and therefore, a circuit that simply rectifies or stabilizes commercial power is not included in the power supply circuit.

Unlike the first wireless communication circuit, the second wireless communication circuit operates with power supplied from the power supply circuit. Examples of the specific form of the second wireless communication circuit include a wireless communication circuit compliant with the IEEE 802.15.4 standard characterized by low-power-consumption operations. However, the second wireless communication circuit is not limited to this and may be, for example, a wireless communication circuit compliant with a wireless local area network (LAN) standard, such as Bluetooth (registered trademark) or IEEE 802.11.

The electronic information generally refers to information that can be communicated, stored, and processed by an electronic circuit.

Further, other aspects of the present disclosure are described below.

(ii) The indication instruction information from the management apparatus may include identification information for identifying the wireless communicator-indicator that is an indication instruction target, and the first wireless communication circuit may store unique identification information, determine whether the identification information included in the indication instruction information matches the stored identification information, and record or output the electronic information if the first wireless communication circuit determines that the identification information included in the indication instruction information matches the stored identification information.

Accordingly, the first wireless communication circuit determines whether the indication instruction information is addressed to the wireless communicator-indicator or addressed to another wireless communicator-indicator on the basis of the identification information, which can make the operator correctly recognize the position of the picking target item even if another wireless communicator-indicator is placed at a position of another picking target item.

(iii) The first wireless communication circuit may include a recording circuit that records the electronic information, and the controller may refer to the electronic information recorded to the recording circuit and perform the process for causing the indication unit to provide an indication.

Accordingly, the controller can perform control so that the controller, for example, successively refers to the recording circuit included in the first wireless communication circuit and causes the indication unit to provide an indication if the electronic information recorded to the recording circuit reflects the indication instruction information.

(iv) The first wireless communication circuit may output a reference request to the controller when receiving the indication instruction information, and the controller may refer to the electronic information recorded to the recording circuit in response to the output reference request.

Accordingly, the controller can perform control so that the controller refers to the recording circuit in response to the reference request output from the first wireless communication circuit receiving the indication instruction information and causes the indication unit to provide an indication.

The first wireless communication circuit may output the electronic information to the controller, and the controller may perform the process for causing the indication unit to provide an indication in response to the output electronic information.

Accordingly, the controller can perform control so that the controller causes the indication unit to provide an indication in response to output of the electronic information reflecting the indication instruction information from the first wireless communication circuit.

(vi) The power supply circuit may include a photovoltaic cell.

Accordingly, power that is supplied by the power supply circuit can be generated by the photovoltaic cell, which can remove the need for a battery or reduce the frequency of battery replacement.

(vii) The power supply circuit may include a storage circuit that stores power generated by the photovoltaic cell and a detection circuit that detects an amount of power stored in the storage circuit, and the controller may determine whether a predetermined amount of power is stored in the storage circuit on the basis of the amount of power detected by the detection circuit, and perform the process for causing the second wireless communication circuit to transmit the picking operation completion information to the management apparatus if the controller determines that the predetermined amount of power is stored.

Accordingly, the detection circuit is used to confirm that an amount of power sufficient for transmission of information by the second wireless communication circuit is stored in the storage circuit, and thereafter, the information is transmitted, which avoids a situation where transmission of information fails due to a shortage of power halfway through the transmission. Further, the need for an extra process for retransmitting the information due to the failure can be removed, and extra time can be saved.

In a case where an amount of power sufficient for transmitting information is not stored in the storage circuit, the information needs to be transmitted after power generated by the photovoltaic cell is sufficiently stored in the storage circuit.

(viii) The operation accepting unit may include a touch operation unit that operates at a touch by the operator.

Accordingly, the operator can make the wireless communicator-indicator recognize completion of a picking operation by performing a simple operation of touching the operation accepting unit. The operator can perform this operation with the picking target item in their hand.

(ix) The controller may perform a process for causing the indication unit to stop providing the indication when the operation accepting unit accepts the operation.

Accordingly, the indication unit is caused to stop providing the indication before the picking operation completion information is transmitted, which can reduce power consumption and allows efficient use of power of the power supply circuit.

Aspects of the present disclosure include a combination of some of the above-described embodiments.

In addition to the embodiments described above, various modifications can be made to the present disclosure. Such modifications are to be construed as being within the scope of the present disclosure. All modifications that come within the meaning and range of equivalency of the claims are intended to be included in the scope of the present disclosure.

The present disclosure contains subject matter related to that disclosed in Japanese Priority Patent Application JP 2017-163417 filed in the Japan Patent Office on Aug. 28, 2017, the entire contents of which are hereby Incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communicator-indicator for communicating with a management apparatus that manages progress in a picking operation, comprising:
   an indication unit that provides an indication for making an operator recognize a position of a picking target item;
   a first wireless communication circuit that receives indication instruction information transmitted from the management apparatus by a radio wave, and records or outputs electronic information that reflects the indication instruction information by using energy of the received radio wave;
   an operation accepting unit that accepts an operation reflecting completion of a picking operation for the picking target item by the operator;
   a power supply circuit that supplies power;
   a second wireless communication circuit that wirelessly transmits picking operation completion information to the management apparatus by using the power of the power supply circuit; and
   a controller that controls the indication unit and the second wireless communication circuit, wherein
   the controller performs a process for causing the first wireless communication circuit to record or output the electronic information that reflects the indication instruction information during a power saving mode,
   after returning to a normal mode from the power saving mode by a predetermined interval, the controller performs a process for reading the electronic information recorded or output by the first wireless communication circuit, causing the indication unit to provide an indication on the basis of the electronic information read, and then causing to transition into the power saving mode, and
   the controller then performs a process for causing the second wireless communication circuit to transmit the picking operation completion information to the management apparatus on the basis of the operation accepted by the operation accepting unit, and then causing to transition into the power saving mode.

2. The wireless communicator-indicator according to claim 1, wherein
   the indication instruction information from the management apparatus includes identification information for identifying the wireless communicator-indicator that is an indication instruction target, and
   the first wireless communication circuit stores unique identification information, determines whether the identification information included in the indication instruction information matches the stored identification information, and records or outputs the electronic information if the first wireless communication circuit determines that the identification information included in the indication instruction information matches the stored identification information.

3. The wireless communicator-indicator according to claim 1, wherein
   the first wireless communication circuit includes a recording circuit that records the electronic information, and
   the controller refers to the electronic information recorded to the recording circuit and performs the process for causing the indication unit to provide an indication.

4. The wireless communicator-indicator according to claim 3, wherein
   the first wireless communication circuit outputs a reference request to the controller when receiving the indication instruction information, and
   the controller refers to the electronic information recorded to the recording circuit in response to the output reference request.

5. The wireless communicator-indicator according to claim 1, wherein
   the first wireless communication circuit outputs the electronic information to the controller, and the controller performs the process for causing the indication unit to provide an indication in response to the output electronic information.

6. The wireless communicator-indicator according to claim 1, wherein
the power supply circuit includes a photovoltaic cell.

7. The wireless communicator-indicator according to claim 6, wherein
the power supply circuit includes a storage circuit that stores power generated by the photovoltaic cell and a detection circuit that detects an amount of power stored in the storage circuit, and
the controller determines whether a predetermined amount of power is stored in the storage circuit on the basis of the amount of power detected by the detection circuit, and performs the process for causing the second wireless communication circuit to transmit the picking operation completion information to the management apparatus if the controller determines that the predetermined amount of power is stored.

8. The wireless communicator-indicator according to claim 1, wherein
the operation accepting unit includes a touch operation unit that operates at a touch by the operator.

9. The wireless communicator-indicator according to claim 1, wherein
the controller performs a process for causing the indication unit to stop providing the indication when the operation accepting unit accepts the operation.

* * * * *